United States Patent [19]

Kinoshita

[11] Patent Number: 4,648,692
[45] Date of Patent: Mar. 10, 1987

[54] MANIPULATOR DEVICE FOR A REFLECTING MIRROR

[75] Inventor: Tsuyoshi Kinoshita, Nishisonogi, Japan

[73] Assignee: Mitsubishi Denki Kabushiki Kaisha, Tokyo, Japan

[21] Appl. No.: 879,491

[22] Filed: Jun. 24, 1986

Related U.S. Application Data

[63] Continuation of Ser. No. 759,676, Jul. 29, 1985, abandoned.

[30] Foreign Application Priority Data

Jul. 30, 1984 [JP] Japan ............... 59-157633

[51] Int. Cl.⁴ ............... G02B 7/18; H01S 3/08; A47G 1/16; A47G 1/24
[52] U.S. Cl. ............... 350/632; 248/476; 248/479; 350/633; 350/636; 372/107
[58] Field of Search ............... 372/99, 107; 350/620, 350/618, 631–634, 636; 248/468, 476, 478–483

[56] References Cited

U.S. PATENT DOCUMENTS

| | | | |
|---|---|---|---|
| 3,481,340 | 12/1969 | McKnight et al. | 350/618 X |
| 3,555,450 | 1/1971 | Rockwell, Jr. | 350/631 X |
| 3,583,734 | 6/1971 | Magi | 248/478 X |
| 3,642,352 | 2/1972 | Beach | 350/632 |
| 3,864,029 | 2/1975 | Mohler | 350/633 |
| 4,030,816 | 6/1977 | Belke et al. | 350/620 |
| 4,442,524 | 4/1984 | Reeder et al. | 350/631 X |
| 4,563,058 | 1/1986 | Yardy | 350/633 X |

FOREIGN PATENT DOCUMENTS 55-26859 7/1980 Japan.

Primary Examiner—John Petrakes
Attorney, Agent, or Firm—Leydig, Voit & Mayer

[57] ABSTRACT

A manipulator device for a reflecting mirror having a mirror holder disposed through a spring between the mirror holder and a housing so that a face of a reflecting mirror mounted on the inner surface of the mirror holder is placed in such a position that an incident beam axis has a perpendicular relation with an outgoing beam axis. A protruding portion is disposed at the center of an outer face of the mirror holder and firmly contacts an opposite face of the holder receiver. A plurality of adjusting bolts are mounted on the holder receiver which is fixed to the housing, allowing the mirror holder to tilt about the center of the protruding portion, so that the angle of the reflecting mirror can be adjustable.

3 Claims, 4 Drawing Figures

MANIPULATOR DEVICE FOR A REFLECTING MIRROR

This application is a continuation of application Ser. No. 759,676, filed July 29, 1985, now abandoned.

BACKGROUND OF THE INVENTION

This invention relates to a manipulator device for a reflecting mirror such as one for use in laser surgical operations, and more particularly to a device for adjusting the reflecting mirror thereof.

FIG. 1 shows an example of a joint portion of a conventional manipulator device. As shown in the figure the device provides an incident beam axis 1 which is the center of an incident beam stream and an outgoing beam axis 2 which is the center of a reflecting beam stream, and comprises a housing 3, an opening 4 in which is mounted a reflecting mirror 8, an arm 5 on which one of end of the housing 3 is rotatably supported through a bearing 6, a mirror holder 7 having one face of which the reflecting mirror 8 is attached, a bolt 9 which acts to press the mirror holder 7 against the housing 3, another bolt 10 which acts to pull the mirror holder 7 apart from the housing 3, a central axis 11 of the opening 4 which substantially bisects the intersection angle between the incident beam axis 1 and the outgoing beam axis 2. Numeral 12 denotes an axis of rotation of the reflecting mirror 8.

Next, the operation of the conventional device having the above construction will be described. In a multi-joint manipulator of the reflecting mirror type, a plurality of joint portions such as that illustrated in FIG. 1 are connected to transmit a laser beam. Therefore, when the incident beam axis 1 is not aligned with the rotation axis 12 of the reflecting mirror 8, a disturbance of the outgoing beam axis 2 increases in proportion to the transmitted distance of a laser beam. As a result, the beam strikes the inside wall of the arm 5 or other part and the laser beam is not transmitted properly. Accordingly, in this joint portion, the incident beam axis 1 and the outgoing beam axis 2 must be adjusted at each jointing portion so as to always align, and a construction which will prevent the non-alignment of the axis due to shocks or other disturbances is required.

To adjust the device as described above, the conventional device illustrated in FIG. 1 is provided with the two types of bolts 9 and 10 mounted at interval of 60 degrees around the mirror holder 7. By properly advancing and retracting the bolts, the adjustment of the slope angle and position of the mirror holder 7 is performed. As a result, the axis of rotation 12 of the reflecting mirror 8 and the incident beam axis 1 are made to align perfectly, and the incident axis 1 and the rotating outgoing beam axis 2 are adjusted so as to perpendicular with each other.

As the joint portion of a conventional multijoint manipulator device for a reflecting mirror is constructed and adjusted as described above, and since the mirror holder 7 is adjusted and secured by the delicate balance of the bolts 9 and 10, the mirror holder 7 can be easily displaced by an external shock. This frequently results in a disturbance of the beam axes. Also, in the conventional construction, the adjustment of the angle and position of the reflecting mirror must be simultaneously performed and both the adjustments relate to each other. Thus, it is difficult to simultaneously adjust the angle and position, and it is impossible to adjust them independently.

SUMMARY OF THE INVENTION

An object of this invention is to eliminate the above disadvantages of conventional manipulates and to provide a multi-joint manipulator device for a reflecting mirror which very easily enables adjustment of the angle and to position of the reflecting mirror.

Another object of this invention is to provide a manipulator device in which the position of the reflecting mirror is defined in advance by the machining accuracy of the components elements, which requires only angle adjustment of the reflecting mirror, and which is not disturbed by external influences.

With the objects in view, a manipulator device for a reflecting mirror has a right angle joint portion provided with a reflecting mirror and adjoining longitudinally extending arms having axial passages and mounted perpendicular to each other. One of the arms is rotatable about the longitudinal axis of the other and the longitudinal axes intersect in the joint portions, and the axial passages allow a laser beam to pass and reflect therethrough. As a result, the incident laser beam can be transmitted to a given position.

A mirror holder is disposed through a spring between the mirror holder and a housing so that a face of the reflecting mirror mounted on a surface of the mirror holder is placed in such a position that the incident beam axis is perpendicular to the outgoing beam axis, and a protruding portion is formed at to the center portion of the back face of the mirror holder to contact the face of either the holder receiver. A plurality of adjusting bolts are mounted on the holder receiver which is fixed to the housing with the mirror holder being tilted about the center of the protruding portion, and the angle of the reflecting mirror can be adjusted by adjusting bolts.

PREFERRED EMBODIMENT OF THE INVENTION

Figure 1:
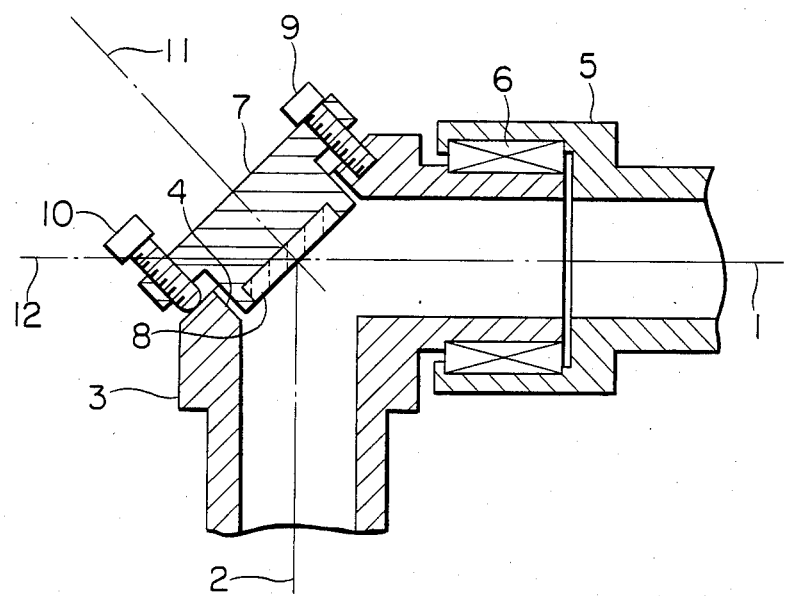
FIG. 1 is a longitudinal sectional view of a right angle joint portion of a conventional multi-joint manipulator device for a reflecting mirror.
Figure 2:
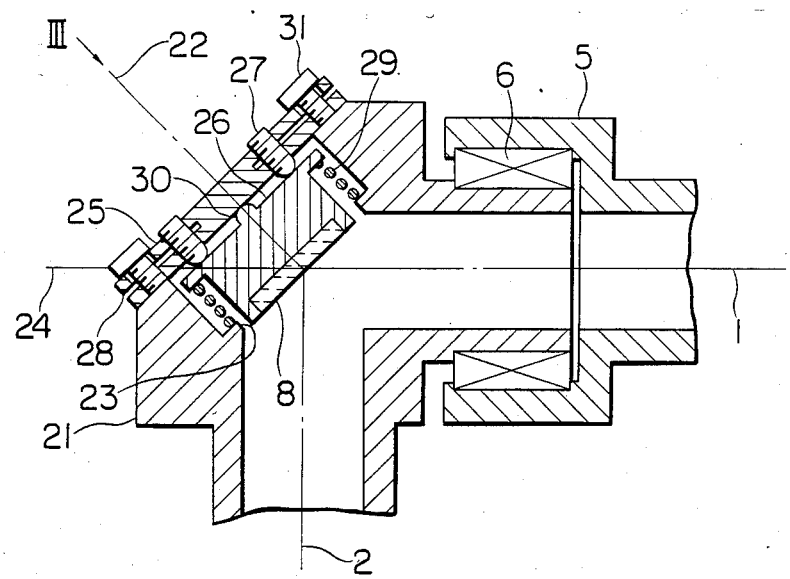
FIG. 2 is a longitudinal sectional view taken along lines II—Ii of FIG. 3 of a joint portion of a manipulator device according to an embodiment of this invention.

Hereinafter, an embodiment of the present invention will be explained while referring to FIGS. 2-4. In the drawings, an incident beam axis 1, an outgoing beam axis 2, an arm 5, a bearing 6, and a reflecting mirror 8, are each identical to that of the conventional device. A housing 21 has nearly the same construction as the housing 3 of the conventional apparatus of FIG. 1. The central axis 22 of an opening 23 in the housing 21 nearly bisects the angle between the incident beam axis 1 and the outgoing beam axis 2, similar to the conventional device. The manipulator device of this invention further comprises an axis of rotation 24 of the reflecting mirror 8, a holder receiver 25 mounted on the housing 21 in which are provided a plurality of adjusting bolts 27 for pressing against the rear surface of a mirror holder 26.

A slit 28 formed in the holder receiver 25 passes through the holder for the adjusting bolts 27. Additionally, spring means, herein shown as a compression spring 29 which, resiliently exerts an outward force on the mirror holder 26 is disposed between the mirror holder 26 and the housing 21. A protruding portion 30 is formed in the center of the outer side (the side facing the holder receiver 25) of the mirror holder 26. The mirror holder 26 is resiliently pushed outwards by the spring 29 so that the protruding portion 30 firmly contacts the inner face of the holder receiver 25, and the adjusting bolts 27 firmly contact the outer side of the mirror holder 26. A first means, herein shown as locking bolts 31, for fastening the receiver to the housing, is screwed. Into receiving holes formed in holder receiver 25 to prevent the rotation of the adjusting bolts 27 by narrowing the width of the slits 28 near the receiving holes for the adjusitng bolts 27. The adjusting bolts 27 serve as a means for adjusting the angle of the mirror relative to the longitudinal axes of the arms. The holder receiver 25 is secured to the housing 21 by mounting bolts 31.

The mirror 8 mounted on the mirror holder 26 as described above is constructed so that the center of the inner face of the reflecting surface of the reflecting mirror 8 intersects the crossihg longitudinal axis of the arm 5. This is achieved by controlling the machining accuracy of the housing 21, the holder receiver 25, the mirror holder 26 and the protoruding portion 30.

The operation of this invention will now be described. In the state where the protruding portion 30 of the mirror holder 26 contacts the holder receiver 25 which is mounted on secured to the housing 21 by the mounting bolts 31, the center of the reflecting surface of the reflecting mirror 8 is assumed to be such that it intersects the longitudinal axis of the arms. Standard factory equipment enables machining accuracy to an extent, sufficient to achieve this alignment.

Figure 3:
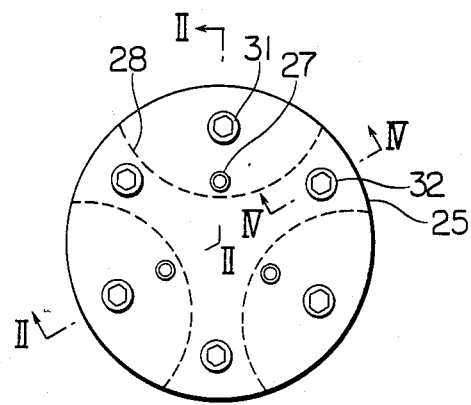
FIG. 3 is a top view taken in the direction of arrow III of FIG. 2.
Figure 4:
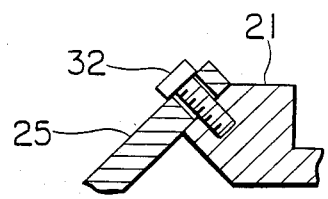
FIG. 4 is a sectional view taken along line IV—IV of FIG. 3.

Under this condition, by properly and delicately advancing and retracting a plurality of bolts 27, e.g., three adjusting bolts shown in FIG. 3, the mirror holder 26 can be tilted about the center of the protruding portion 30 thereof, and the angle of the reflecting mirror 8 can be adjusted within a predetermined range. The inspection of whether the laser beam is correctly reflected without striking the inside wall and the jointing portion is continuously performed during this adjustment. When the proper angle is found, the locking bolts 31 are tightened. The width the slit 28 formed in the holder receiver 25 is decreased by the tightening of the locking bolts 31 and the adjusting bolts 27 will be thereby prevented from rotating or from loosening due to external shocks. The mirror holder 26 is continuously pressed against the holder receiver 25 by the spring 29, and the portion of the mirror holder is maintained.

During the adjustment of the angle of the mirror holder 26, the inward and outward movement of the reflecting mirror 8 is negligible in the center, the only perceptible movement occurring along the periphery of the reflecting mirror 8, so the inwards and outwards movement has essentially no influence on the beam.

As described above, the device for adjusting a reflecting mirror of this invention requires only simple angle adjustments, and as a result no experience or skill is necessary. This device can be quickly adjusted, and the construction is such that the angle of adjustment is not easily disturbed by external shocks. Furthermore, readjustment can also be easily performed.

In the above described embodiment, the slit 28 and the locking bolts 31 are used to prevent the rotation of the adjusting bolts 27. However, other known fixing means, such as a lock nut or the like can be. used with the same effect. Although the protruding portion is formed on the mirror holder 26, it may instead be formed on the inner surface of the holder receiver 25, too.

What is claimed is:

1. A manipulator device including a reflecting mirror for reflecting a laser beam comprising:
    adjoining longitudinally extending arms having axial passages and mounted perpendicular to each other;
    means including a right angle joint portion for mounting one of said arms for rotation about the longitudinal axis of the other of said arms, the longitudinal axes intersecting in said joint portion;
    a housing included in said joint portion for mounting a holder for said reflecting mirror, a receiver for said mirror holder mounted in said housing having an outer face opposing an inner face of said mirror holder;
    adjustable means for mounting said mirror holder on said receiver so that the face of said mirror is held at said intersection at substantially 45 degrees to said longitudinal axes so as to reflect an incident laser beam along one of said axes to an outgoing beam along the other axis;
    said adjustable means including:
    spring means connected to said housing resiliently urging said mirror holder toward said receiver;
    first means for fastening said receiver to said housing; and
    second means for adjusting the angle of said mirror relative to said axes.

2. A manipulator device for a reflecting mirror as claimed in claim 1 wherein said first adjustable means includes a plurality of adjusting bolts for fastening said receiver to said housing.

3. A manipulator device for a reflecting mirror as claimed in claim 1, said mirror holder having a protruding portion on said outer face engaging the opposite face of said receiver.

* * * * *